United States Patent
Boehling et al.

(10) Patent No.: US 9,034,293 B2
(45) Date of Patent: May 19, 2015

(54) PROCESS FOR PREPARING HYDROCYANIC ACID BY CATALYTIC DEHYDRATION OF GASEOUS FORMAMIDE—DIRECT HEATING

(75) Inventors: Ralf Boehling, Lorsch (DE); Andreas Deckers, Flomborn (DE); Achim Gritsch, Rotterdam (NL); Stefan Kotrel, Bedminster, NJ (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/935,840

(22) PCT Filed: Mar. 30, 2009

(86) PCT No.: PCT/EP2009/053723
§ 371 (c)(1),
(2), (4) Date: Sep. 30, 2010

(87) PCT Pub. No.: WO2009/121827
PCT Pub. Date: Oct. 8, 2009

(65) Prior Publication Data
US 2011/0033363 A1    Feb. 10, 2011

(30) Foreign Application Priority Data
Mar. 31, 2008   (EP) .................................... 08153830

(51) Int. Cl.
*C01C 3/02*   (2006.01)
*B01J 19/00*  (2006.01)
*B01J 19/24*  (2006.01)

(52) U.S. Cl.
CPC .............. *C01C 3/0204* (2013.01); *C01C 3/02* (2013.01); *B01J 19/0093* (2013.01); *B01J 19/249* (2013.01); *B01J 2219/00783* (2013.01); *B01J 2219/00788* (2013.01); *B01J 2219/00822* (2013.01); *B01J 2219/00824* (2013.01);
(Continued)

(58) Field of Classification Search
CPC ......................................................... C01C 3/02
USPC ......................................................... 423/373
See application file for complete search history.

(56) References Cited

U.S. PATENT DOCUMENTS

| 1,675,366 A   | 7/1928  | Magill et al. |
| 2,042,451 A * | 6/1936  | Bond et al. ..................... 423/373 |

(Continued)

FOREIGN PATENT DOCUMENTS

| DE | 10 00 796  | 1/1957 |
| DE | 101 32 370 | 2/2003 |

(Continued)

OTHER PUBLICATIONS

Joerg et al., (WO 0132302 A1), May 10, 2001, EPO translation.*
(Continued)

*Primary Examiner* — Melissa Swain
(74) *Attorney, Agent, or Firm* — Oblon, McClelland, Maier & Neustadt, L.L.P.

(57) ABSTRACT

Process for preparing hydrocyanic acid by catalytic dehydration of gaseous formamide, wherein the dehydration of formamide is coupled with an exothermic reaction by the reactor used in the dehydration comprising two separate fluid paths which are separated by a common reactor wall, with one fluid path being provided for the dehydration of formamide and the second fluid path being provided for the exothermic reaction.

10 Claims, 1 Drawing Sheet

(52) U.S. Cl.
CPC . *B01J2219/00835* (2013.01); *B01J 2219/0086* (2013.01); *B01J 2219/00873* (2013.01); *B01J 2219/00889* (2013.01); *B01J 2219/2453* (2013.01); *B01J 2219/2459* (2013.01); *B01J 2219/2465* (2013.01); *B01J 2219/2474* (2013.01); *B01J 2219/2479* (2013.01); *B01J 2219/2481* (2013.01); *B01J 2219/2486* (2013.01); *B01J 2219/2487* (2013.01); *B01J 2219/2497* (2013.01)

(56) References Cited

U.S. PATENT DOCUMENTS

| | | | |
|---|---|---|---|
| 4,693,877 | A | 9/1987 | Oehsen et al. |
| 7,294,326 | B2 | 11/2007 | Bassler et al. |
| 7,442,277 | B2 | 10/2008 | Kupper et al. |
| 2002/0031455 | A1* | 3/2002 | Hippel et al. ............ 422/173 |
| 2004/0031495 | A1* | 2/2004 | Steinberg ............... 131/194 |
| 2004/0033455 | A1* | 2/2004 | Tonkovich et al. ........... 431/7 |
| 2006/0110309 | A1* | 5/2006 | Babler et al. ............ 423/372 |
| 2008/0307825 | A1 | 12/2008 | Kolb et al. |
| 2010/0284889 | A1 | 11/2010 | Boehling et al. |
| 2010/0316552 | A1 | 12/2010 | Boehling et al. |

FOREIGN PATENT DOCUMENTS

| | | |
|---|---|---|
| DE | 101 38 553 | 5/2003 |
| DE | 10 2005 051 637 | 5/2007 |
| EP | 0 209 039 | 1/1987 |
| EP | 0 885 653 | 12/1998 |
| EP | 0 967 005 | 12/1999 |
| WO | 01 32302 | 5/2001 |
| WO | 2004 050587 | 6/2004 |
| WO | 2005 016512 | 2/2005 |
| WO | 2006 108796 | 10/2006 |

OTHER PUBLICATIONS

International Search Report issued Feb. 11, 2010 in PCT/EP09/053723 filed Mar. 30, 2009.

U.S. Appl. No. 13/030,816, filed Feb. 18, 2011, Baumann, et al.

* cited by examiner

PROCESS FOR PREPARING HYDROCYANIC ACID BY CATALYTIC DEHYDRATION OF GASEOUS FORMAMIDE—DIRECT HEATING

The present invention relates to a process for preparing hydrocyanic acid by catalytic dehydration of gaseous formamide, wherein the dehydration of formamide is coupled with an exothermic reaction by the reactor used in the dehydration comprising two separate fluid paths which are separated by a common reactor wall, with one fluid path being provided for the dehydration of formamide and the second fluid path being provided for the exothermic reaction.

Hydrocyanic acid is an important basic chemical which serves, for example, as starting material in numerous organic syntheses such as the preparation of adiponitrile, methacrylic esters, methionine and complexing agents (NTA, EDTA). Furthermore, hydrocyanic acid is required for the preparation of alkali metal cyanides which are used in mining and in the metallurgical industry.

The major part of hydrocyanic acid is produced by reaction of methane (natural gas) and ammonia. In the Andrussov process, atmospheric oxygen is simultaneously added. In this way, the preparation of hydrocyanic acid proceeds autothermally. In contrast thereto, the BMA process of Degussa AG is carried out without oxygen. The endothermic catalytic reaction of methane with ammonia is therefore operated using an external heating medium (methane or $H_2$) in the BMA process. A disadvantage of the abovementioned processes is the large amount of ammonium sulfate which is unavoidably formed since the reaction of methane proceeds economically only with an excess of $NH_3$. The unreacted ammonia is scrubbed from the crude process gas by means of sulfuric acid.

A further important process for preparing hydrocyanic acid is the SOHIO process. The ammonoxidation of propene/propane to form acrylonitrile is accompanied by the formation of about 10% (based on propene/propane) of hydrocyanic acid as by-product.

A further important process for the industrial preparation of hydrocyanic acid is the endothermic thermal dehydration of formamide under reduced pressure, which proceeds according to equation (I):

$$HCONH_2 \rightarrow HCN + H_2O \qquad (I)$$

This reaction is accompanied by the decomposition of formamide according to equation (II) to form ammonia and carbon monoxide:

$$HCONH_2 \rightarrow NH_3 + CO \qquad (II)$$

The ammonia formed is scrubbed from the crude gas by means of sulfuric acid. However, due to the high selectivity only very little ammonium sulfate is obtained.

The ammonia formed catalyzes the polymerization of the desired hydrocyanic acid and thus leads to a deterioration in the quality of the hydrocyanic acid and a reduction in the yield of the desired hydrocyanic acid.

The polymerization of hydrocyanic acid and the associated formation of soot can be suppressed by addition of small amounts of oxygen in the form of air, as disclosed in EP-A 0 209 039. EP-A 0 209 039 discloses a process for the thermolytic dissociation of formamide over highly sintered shaped aluminum oxide or aluminum oxide-silicon oxide bodies or over high-temperature corrosion-resistant shaped chromium-nickel stainless steel bodies. According to the examples, the dissociation is carried out in single-tube reactors which are filled with the abovementioned catalyst and heated externally by means of a salt bath.

U.S. Pat. No. 2,042,451 relates to a process for the dehydration of formamide for preparing hydrocyanic acid, in which a heated surface coated with a thin catalytically active oxide layer is used as catalyst. Brass or iron is used as material for the heated surface and aluminum oxide, manganese oxide, chromium oxide or tin oxide serves as catalytically active oxide layer. According to the description in U.S. Pat. No. 2,042,451, no part of the formamide gas to be decomposed is more than half an inch from the catalytic surface. To carry out the endothermic formamide decomposition, an oven is used according to U.S. Pat. No. 2,042,451.

DE-A 1 000 796 relates to a process for the dissociation of formamide vapor, in which a temperature gradient within the reaction space is taken into account by the dissociation being carried out over granular or particulate highly fired iron oxide-comprising silicates or spinels in a dissociation space whose wall has a lower catalytic activity than the catalysts in the dissociation space. The wall comprises, for example, stainless steel comprising, in particular, about 84% of iron and 16% of chromium. The dissociation space is formed by externally heated tubes.

WO 2004/050587 discloses a process for preparing hydrocyanic acid from formamide, in which the dissociation is carried out in empty metal tubes which have an internal reactor surface made of a steel comprising iron together with chromium and nickel. High hydrocyanic acid selectivities are achieved by means of the process even when only a low vacuum is applied. The process can be carried out at pressures up to 300 mbar. According to the examples, the dehydration is carried out in a reaction tube which is electrically heated from the outside.

To provide the high temperatures necessary for the dehydration of formamide, the reactors of the prior art are usually heated externally, frequently by means of circulating gas which is heated by means of flue gas. As a result of the poor heat transfer on the heating gas side associated therewith in combination with the considerable quantity of heat required for the dissociation (dehydration), high heat-exchange areas are required for introduction of the heat required for the dehydration of formamide. As a result of the large heat-exchange areas of the reactors and the circulating gas circuit with flue gas production, the dehydration part (reaction part) represents a considerable part of the capital costs in the construction of a plant for the preparation of hydrocyanic acid by dehydration of formamide.

Furthermore, it is desirable to provide small production units for preparing hydrocyanic acid in order to avoid the transport of hydrocyanic acid or alkali metal cyanide produced therefrom (on-demand production). Large reactors with circulating gas circuits are a hindrance here.

It is therefore an object of the present invention to provide a process for preparing hydrocyanic acid which can be carried out in inexpensive, compact systems having fast start-up and shutdown dynamics and efficient introduction of heat, so that on-demand production of hydrocyanic acid is made possible. The process should have a high selectivity to the desired hydrocyanic acid and be operated without circulating gas.

Figure 1:
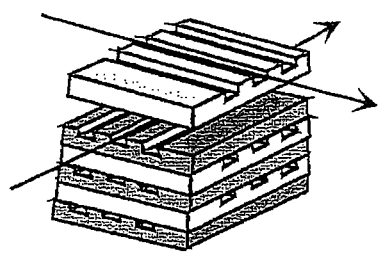
FIG. 1 shows a schematic three-dimensional section of a reactor according to one embodiment of the invention.

The object is achieved by a process for preparing hydrocyanic acid by catalytic dehydration of gaseous formamide at temperatures of from 350 to 650° C. in a reactor.

In the process of the invention, the dehydration of formamide is then coupled with an exothermic reaction by the reactor comprising two separate fluid paths which are separated by a common reactor wall, with one fluid path being provided for the dehydration of formamide and the second fluid path being provided for the exothermic reaction and the common reactor wall being made of a material having a specific thermal conductivity $\lambda$ of at least 10 W/(mK), preferably at least 15 W/(mK), particularly preferably 20 W/(mK).

For the purposes of the present patent application, coupling of the dehydration of formamide with an exothermic reaction means coupling in terms of energy via heat exchange. As a result of the coupling of the endothermic dehydration of formamide with an exothermic reaction, a significant reduction in the heat-exchange area required can be achieved and circulating gas can be dispensed with. The common reactor wall having a specific thermal conductivity of at least 10 W/(mK) which separates the endothermic dehydration of formamide and the exothermic reaction makes efficient thermal coupling between the exothermic reaction and the endothermic dehydration of formamide possible.

This makes it possible to provide small production units for hydrocyanic acid production, as a result of which the capital costs can be reduced and on-demand production is made possible.

Compared to introduction of the heat by means of circulating gas, as is carried out in the prior art, the gas loading on the heating side is reduced by a factor of two or more in the process of the invention. At the same pressure drop, the reactor used for the dehydration of formamide (decomposer) can therefore be constructed considerably more compactly. In addition, the circulating gas compressors which are usually used and the generation of circulating gas are dispensed with. If appropriate, a gas/gas heat exchanger for preheating combustion air and recovering heat can be used in the process of the invention.

When the endothermic dehydration of formamide is coupled with an exothermic reaction, ignition and extinguishing phenomena can occur in the reactor, i.e. when the heat of the exothermic reaction on the heating side is not removed sufficiently by the dehydration of formamide on the reaction side, hot spots and high temperature gradients can be formed in the reactor. Such hot spots can not only lead to decreases in selectivity and conversion but thermal damage to the reactor can also occur in the region of the hot spots. The use according to the invention of a reactor wall which separates the exothermic reaction from the dehydration of formamide enables the heat of the exothermic reaction to be distributed by thermal conduction in the reactor wall so that the formation of hot spots and/or the formation of high temperature gradients in the reactor are avoided. To avoid hot spots, the reactor material has to display sufficient thermal conduction and it is also necessary to choose suitable dimensions of the channel length and plate thickness. Shorter channels and thicker plates lead to reduced hot spots.

Improved thermal coupling and distribution of the heat of reaction can be achieved according to the invention by:
  improved heat transfer between gas and wall material
  wall-catalytic reaction: generation/consumption of heat at the wall
  distribution of the heat of reaction by means of a high proportion of wall material and a specific thermal conductivity of at least 10 W/(mK).

The coupling of endothermic reactions with exothermic reactions is already known in the prior art. However, such a coupling of exothermic and endothermic reactions has not hitherto been mentioned for a process for preparing hydrocyanic acid.

EP 0 967 005 A2 relates to a reactor for steam reforming of a hydrocarbon or hydrocarbon derivative starting material such as methanol with a catalytic oxidation of the starting material being carried out simultaneously to provide the heat required for the reforming reaction. The reactor used according to EP 0 967 005 A2 comprises an oxidation stage for carrying out the oxidation with the introduction of the starting material and an oxygen-comprising gas and also a reformer stage downstream of the oxidation stage for carrying out the steam reforming reaction, with the reformer stage being in heat transfer connection with the oxidation stage. The reactor according to EP 0 967 005 A2 is said to be used, in particular, for the production of hydrogen for motor vehicles powered by fuel cells. Precise information as to how the heat transfer connection between the reformer stage and the oxidation stage is established is absent in EP 0 967 005 A2. It is only stated that the reformer stage is in heat transfer connection with the oxidation stage via a gastight dividing wall. As regards the material of the gastight dividing wall, EP 0 967 005 A2 provides no information.

EP 0 885 653 A2 discloses a compact reactor for catalyzed chemical reactions in a gaseous and/or liquid phase, where two streams are passed through the reactor in cocurrent or countercurrent, with very good thermal contact of the catalyst and between the two streams being ensured. According to EP 0 885 653 A2, the reactor comprises parallel flow channels for the two streams, which channels are formed by accordion-like folding of a dividing wall. Corrugated structures are brought up against the folds formed in this way, so that continuous flow channels for the fluid streams are produced. The reactor walls can be coated with a catalyst. However, EP 0 885 653 A2 does not mention what materials or catalysts are used in the reactor.

WO 01/32302 A1 discloses a reactor arrangement for the autothermal coupling of exothermic and endothermic reactions with separate flow paths of the two reaction streams, which comprises heat exchange segments between all feed gases introduced and all hot product gases and also a reaction region in which the exothermic and endothermic reactions proceed with direct heat exchange between them. As regards the materials used which make the heat exchange according to WO 01/32302 possible, WO 01/32302 A1 gives no information.

As mentioned above, none of the abovementioned documents relates to a process for preparing hydrocyanic acid. Furthermore, none of the abovementioned documents indicates that the formation of high temperature gradients in the reactor and the formation of hot spots can be avoided by the heat transfer occurring in an axial direction via the common reactor wall which has a specific thermal conductivity $\lambda$ of at least 10 W/(mK).

The exothermic reaction in the process of the present invention is preferably a catalytic combustion of combustible gases (fuel gases) with introduction of oxygen, preferably atmospheric oxygen. As combustible gases, it is in principle possible to use all gas mixtures and gases used for flue gas production. Hydrocarbons or hydrocarbon-comprising mixtures are usually used as combustible gases. Suitable hydrocarbons are, in particular, methane, ethane, propane, butane, pentane and mixtures of these gases or mixtures comprising one or more of the hydrocarbons mentioned together with further gases. Suitable fuel gases are known to those skilled in the art.

The combustion of the combustible gases (fuel gases) is usually carried out in the presence of a catalyst. Suitable catalysts are likewise known to a person skilled in the art. For example, it is possible to use noble metals and alloys of groups 8B and 1B, e.g. Pt, Pd, Ag and Au. Oxides such as MgO, CoO, $MoO_3$, NiO, ZnO, $Cr_2O_3$, $WO_3$, SnO, $CuO/Cu_2O$, $MnO_2$ or $V_2O_5$ are also used. Mixed oxides such as CuO—ZnO—$Al_2O_3$, CoO—MgO, CoO—$La_2O_3$, $La_2CuO_4$, $Nd_2CuO_4$, Co—ZnONiO—$MoO_3$, perovskites such as $LaMnO_3$, $CoTiO_3$, $LaTiO_3$, $CoNiO_3$ and spinels such as $CuAl_2O_4$, $MgAl_2O_4$, $(Cu, Zn)Al_2O_4$, $(Cu, Zn, Ba)Al_2O_4$, $(Cu, Zn, Mg)Al_2O_2$, $(Cu, Zn, Va) Al_2O_4$ or $LaNiO_4$ are also suitable. It is possible to introduce the catalysts in the form of internals or beds into the part of the reactor in which the catalytic combustion occurs, i.e. in the fluid path provided for the exothermic reaction. Furthermore, as an alternative to or together with the internals or beds, it is possible for the side of the reactor wall which is in contact with the combustible gas to have a catalytically active coating. Particular preference is given to variants without internals or beds with coated walls. This coating is generally made up of the abovementioned catalyst materials. Methods of applying the coating are known to those skilled in the art. The catalytically active coating usually has a thickness of generally from 0.01 to 200 μm, preferably from 0.1 to 100 μm, particularly preferably from 0.5 to 70 μm. The thickness of the catalytically active coating is generally selected so that the specific thermal conductivity of the coated reactor wall is not significantly impaired.

Particular preference is given to using a catalytically active coating which is particularly preferably selected from the group consisting of the metals of groups 1b and 8b of the Periodic Table or the class of mixed oxides, in particular the perovskites, on the reactor wall (without further internals or beds) as catalyst in the catalytic combustion of combustible gases.

The oxygen required for the catalytic combustion can all be mixed into the combustible gas directly at the inlet for the combustible gas into the reactor. However, it is likewise possible to mix in only part of a reactant, either oxygen or combustible gas, at the inlet into the reactor and to introduce further amounts of the reactant into the other reactant at a plurality of points along the fluid path. Here, the part of the reactant which is mixed in at the beginning should be smaller than the amount of the reactant which is required for complete combustion of the combustible gases. As a result of the introduction of one reactant in the combustion at a plurality of points along the fluid path, the total amount of the combustible gas is not burnt immediately at the beginning of the fluid path but instead combustion of the combustible gases occurs along the entire fluid path. In this way, even more uniform distribution of the heat evolved in the exothermic reaction can be achieved.

The endothermic dehydration of gaseous formamide is carried out at temperatures of from 350 to 650° C., preferably from 450 to 550° C., particularly preferably from 500 to 550° C. If higher temperatures are chosen, reduced selectivities have to be reckoned with.

The pressure in the dehydration of formamide is generally in the range from 100 mbar to 4 bar, preferably from 300 mbar to 3 bar.

For the purposes of the present patent application, the pressure specified above and in the following is the absolute pressure.

The optimal residence time of the formamide gas stream in the process of the invention is determined by the length-specific space velocity of formamide, which is generally from 0.02 to 0.4 kg/(mh), preferably from 0.05 to 0.3 kg/(mh), particularly preferably from 0.08 to 0.2 kg/(mh), in the region of laminar flow. The optimal residence time thus depends on the tube diameter. Smaller tube diameters therefore lead to shorter optimal residence times. As mentioned above, the value given above for the length-specific space velocity of formamide applies to the region of laminar flow. In the case of turbulent flow, the space velocity can be higher.

The process of the invention is preferably carried out in the presence of oxygen, preferably atmospheric oxygen. The amounts of oxygen, preferably atmospheric oxygen, are generally from >0 to 10 mol %, based on the amount of formamide used, preferably from 0.1 to 10 mol %, particularly preferably from 0.5 to 3 mol %. For this purpose, gaseous formamide (formamide vapor) can be admixed with oxygen, preferably atmospheric oxygen, before being fed into the tube reactor or plate reactor.

The catalytic dehydration according to the invention can be carried out over any catalyst known for the catalytic dehydration of formamide. Suitable catalysts for the dehydration of formamide are known to those skilled in the art. For example, the catalytic dehydration according to the invention can be carried out in the presence of shaped bodies as catalysts, with the shaped bodies being selected from the group consisting of highly sintered shaped bodies made up of aluminum oxide and, if appropriate, silicon oxide, preferably from 50 to 100% by weight of aluminum oxide and from 0 to 50% by weight of silicon oxide, particularly preferably from 85 to 95% by weight of aluminum oxide and from 5 to 15% by weight of silicon oxide, and shaped chromium-nickel stainless steel bodies as described, for example, in EP-A 0 209 039. Furthermore, the catalysts suitable for the catalytic dehydration according to the invention can be packings composed of steel or iron oxide on porous support materials, e.g. aluminum oxide. Suitable packings are described, for example, in DE-A 101 38 553.

If shaped bodies are used, it is possible to use both ordered and disordered bodies, e.g. Raschig rings, Pal rings, pellets, spheres and similar bodies, as possible shaped bodies. It is important that the packings allow good heat transfer at a moderate pressure drop. The size or geometry of the shaped bodies used generally depends on the internal diameter of the reactors to be filled with these shaped bodies, preferably tube reactors or plate reactors.

Suitable packings composed of steel or iron oxide are generally ordered packings. The ordered packings are preferably static mixers. The use of static mixers enables a uniform pressure and excellent heat transfer to be achieved in the tube reactor or plate reactor. The static mixers can have any geometries known to those skilled in the art. Preferred static mixers are made up of metal sheets, which can be perforated metal sheets and/or shaped metal sheets. It is of course likewise possible to use shaped perforated metal sheets.

Suitable shaped bodies are described in EP-A 0 209 039 and suitable static mixers are described in DE-A 101 38 553.

It is also possible for the side of the reactor wall which is in contact with the formamide to have a catalytically active coating. This coating can be present as an alternative to or together with one of the abovementioned catalysts. Suitable catalytically active coatings and their thickness are known to those skilled in the art. The thickness of the catalytically active coating is usually selected so that the specific thermal conductivity of the coated reactor wall is not significantly impaired.

It has been found that a catalytically active reactor wall of iron or steel as is frequently used according to the prior art in a reactor for the dehydration of formamide permits only short channel lengths in the process of the invention because of the low thermal conductivity of iron or steel. According to the invention, the common reactor wall separating the fluid paths (fluid path for the dehydration of formamide and fluid path for an exothermic reaction) is, to allow longer channel geometries, made up of a material selected from the group consisting of copper, silver, aluminum, magnesium, magnesium oxide, brass, carbides, in particular silicon carbides, nitrides, in particular aluminum nitride, carbon, in particular in the form of graphite or carbon nanotubes (CNTs), silicon and oxidation-resistant silicon-infiltrated silicon carbide SiSiC.

It has been found that a high thermal conductivity of the common reactor wall separating the fluid paths is advantageous for coupling of the exothermic reaction with the endothermic dehydration of formamide. The abovementioned materials have specific thermal conductivities above 100 W/(mK).

A further important factor in achieving a good thermal conductivity and a uniform temperature over the fluid path for the dehydration of formamide and thus stable operation is, in addition to the thermal conductivity of the material of the common reactor wall separating the fluid paths, the thickness of the common reactor wall. The thickness of the common reactor wall is usually from 0.5 to 10 mm, preferably from 1 to 6 mm, particularly preferably from 1 to 3 mm. Here, thicker plates generally lead to an increasing heat flow within the reactor material and to a more uniform temperature over the fluid path for the dehydration of formamide and thus to a more stable operating point. Very high thicknesses lead only to a slight improvement of the heat flow but increase consumption of materials and size.

The reactor used in the process of the invention is generally a multitube reactor or plate reactor which has at least two separate fluid paths which are separated by a common reactor wall, with one fluid path being provided for the dehydration of formamide and the second fluid path being provided for the exothermic reaction.

A preferred reactor is a plate reactor in which the individual plates are joined to one another over their entire area, made up of at least two parallel, superposed layers A and B, with the layer A having at least two parallel reaction channels in which the catalytic dehydration occurs and the layer B having at least two parallel channels in which the exothermic reaction occurs.

For the purposes of the present patent application, a layer is a largely two-dimensional, flat component, i.e. a component whose thickness is negligibly small compared to its area. The layer is preferably an essentially flat plate which is structured to form the abovementioned channels. Suitable thicknesses of the layer correspond to the abovementioned thicknesses of the common reactor wall.

To achieve very good heat distribution and a uniform temperature over the fluid path for the dehydration of formamide and thus maintain stable operation, it is desirable for the abovementioned reactor to have very short edge lengths. Suitable edge lengths are generally from 2 to 100 cm, preferably from 3 to 70 cm, particularly preferably from 6 to 40 cm. The optimal edge length depends on the thermal conductivity of the material used. For the purposes of the present patent application, edge lengths are the extensions of the abovementioned plates in two dimensions in a plane (with the extension in one dimension in each case being an edge length).

The abovementioned tube reactor or plate reactor usually has from 2 to 1000, preferably from 40 to 500, alternately superposed layers A in which the catalytic dehydration occurs and layers B in which the exothermic reaction occurs, with each individual layer having a plurality of, preferably from 10 to 500, particularly preferably from 20 to 200, parallel channels which form a continuous flow path from one side of the layer to the opposite side of the same.

As mentioned above, the gaseous formamide to be dehydrated flows through the respective layers A and a fuel gas usually flows through the layers B.

The fluid path for the dehydration of formamide and the fluid path for the exothermic reaction each have, in a preferred embodiment, a length of from 2 to 100 cm, preferably from 3 to 70 cm, particularly preferably from 6 to 40 cm.

The average hydraulic diameter of the reaction channels of the layers A in the abovementioned preferred reactor is generally from 0.5 to 6 mm, preferably from >1 to 4 mm, particularly preferably from >1 to 3 mm. The channels of the layers B generally have an average hydraulic diameter of <4 mm, preferably from 0.2 to 3 mm, particularly preferably from 0.5 to 2 mm.

It has been found that, for the same length of the reaction tube of the tube reactor or plate reactor and the same formamide throughput, smaller diameters (channel geometries) lead to no significant reduction in the conversion to the desired hydrocyanic acid despite the significantly higher surface loading at small channel geometries. Furthermore, it has been found that blockage of the reaction tubes of the tube reactor or plate reactor by deposits can be avoided by dimensioning of the reaction tube in the millimeter range of generally from 0.5 to 6 mm, preferably from >1 to 4 mm, particularly preferably from >1 to 3 mm, so that long operating life of the milli/microstructured tube reactor or plate reactor can be achieved.

The hydraulic diameter $d_h$ is a theoretical parameter by means of which calculations can be carried out on tubes or channels having a noncircular cross section. The hydraulic diameter is four times the flow cross section A divided by the circumference C of a measurement cross section wetted by the fluid:

$$d_h = 4A/C$$

The average hydraulic diameter is in each case based on a reaction channel of the reactor which is preferably used.

As mentioned above, the layers A through which gaseous formamide flows alternate with layers B on one side of which the compound required for the exothermic reaction and oxygen, preferably atmospheric oxygen (if appropriate part of a reactant, with further portions being fed in at a plurality of points along the fluid path) are fed in and on the other side of which the mixture formed in the exothermic reaction is taken off. For the purposes of the present patent application, an alternating arrangement of the layers A and B means that either each layer A is followed by a layer B or that each pair of successive layers A is followed by a layer B or that each layer A is followed by a pair of successive layers B. In each case, it should be ensured that the layers A have at least one reactor wall common with the layers B in order to make the thermal coupling according to the invention possible.

The pressure drop in the dehydration process of the invention is set so that it is generally <2 bar, preferably from 0.02 to 1 bar.

The channels of the layers A and B in the preferred reactor can be arranged so that the streams are conveyed in cross-current, countercurrent or cocurrent. Furthermore, any mixed forms are conceivable. In principle, cocurrent of flow is preferred in the process of the invention in order to achieve a very uniform temperature distribution over the reactor.

In the reactor which is preferably used according to the invention, a distributor facility for introduction of the starting materials (the gaseous formamide) is usually provided at one end of the layers A for the channels of the layers A and a collection facility for the reaction product (hydrocyanic acid) is provided at the other end of the layers A. Here, one distributor facility generally supplies all layers A. Furthermore, one collection facility is generally provided for all layers A. All the layers A usually form a continuous system of reaction channels.

In general, a distribution facility and a collection facility corresponding to the distribution and collection facilities for the layers A are also provided for the layers B in whose channels the exothermic reaction takes place. However, it is also possible for the layers B to have a plurality of distribution facilities in order to make possible a distributed addition of a reactant in the exothermic reaction at a plurality of points along the fluid path. All layers B usually form a continuous system of channels in which the exothermic reaction takes place.

In one embodiment of the preferred reactor, the distribution and collection facilities are each configured as a chamber arranged outside the stack of the layers A and B. Here, the walls of the chamber can be straight or, for example, semicircular. It is important that the geometric shape of the chamber is suitable for achieving a flow and pressure drop such that uniform flow through the channels is achieved.

In a further embodiment, the distribution and collection facilities are each arranged within a stack of layers A and B by the parallel channels of each layer A or each layer B each having a transverse channel connecting the parallel channels in the region of each of the two ends of the layer and all transverse channels within a stack of layers A and B being connected by a collection channel arranged essentially perpendicularly to this plane of the layers A and B. In this case too, it is important that the geometric shape of the chamber is suitable for achieving a flow and pressure drop such that uniform flow through the channels is achieved. Suitable geometric shapes of the chamber are known to those skilled in the art.

As mentioned above, the two abovementioned embodiments are not intended to rule out the possibility of the oxygen required for carrying out the exothermic reaction to be fed in at a plurality of points along the fluid path.

FIG. 1 shows, by way of example, a schematic three-dimensional section of a suitable reactor, with the layers A and B in FIG. 1 being arranged alternately so that each layer A is followed by a layer B and the arrangement of the layers A and B is such that cross-current flow is obtained.

In FIG. 1:
A denotes layers A through which formamide flows
B denotes layers B in which the exothermic reaction takes place
The arrows in each case indicate the flow direction of the formamide or of the medium used for carrying out the exothermic reaction.

Figure 2:
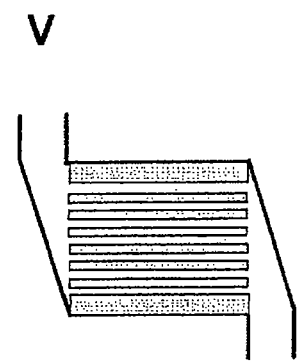
FIG. 2 shows a schematic plane view of a layer which can be A or B of FIG. 1 of a reactor and further showing a distributor facility V and a collection facility S according to one embodiment of the invention.

FIG. 2 shows, by way of example, a schematic plane view of a layer which can be a layer A or B. Within the layer, a distributor facility V and a collection facility S are shown schematically.

In FIG. 2:
V denotes a distributor facility
S denotes a collection facility
K denotes channels The preferred reactor can be produced by methods known to those skilled in the art. Suitable methods are disclosed, for example, in V. Hessel, H. Löwe, A. Müller, G. Kolb, Chemical Microprocess Engineering-Processing and Plants, Wiley-VCH, Weinheim, 2005, pp. 385 to 391, and W. Ehrfeld, V. Hessel, V. Haferkamp, Microreactors, Ullmann's Encyclopedia of Industrial Chemistry, Wiley-VCH, Weinheim, 1999. Production of the reactor usually comprises producing a microstructure in the individual layers by machining plates of materials suitable for the reactor, stacking the layers, joining the layers to construct the reactor and installing connections for introduction of the gaseous formamide or discharge of the hydrocyanic acid and, if appropriate, the introduction and discharge of the starting materials used in the exothermic reaction and products formed. DE-A 10 2005 051 637 describes various methods of producing microstructured reactors which can be employed analogously for producing the above-described preferred reactor.

The gaseous formamide used in the process of the invention is obtained by vaporization of liquid formamide. Suitable methods of vaporizing liquid formamide are known to those skilled in the art and are described in the prior art mentioned in the introductory part of the description.

The vaporization of the liquid formamide is preferably carried out in a vaporizer at temperatures of from 200 to 300° C., preferably from 210 to 260° C., particularly preferably from 220 to 240° C. The pressure in the vaporization of the liquid formamide is usually from 400 mbar to 4 bar, preferably from 600 mbar to 2 bar, particularly preferably from 800 mbar to 1.4 bar.

In a preferred embodiment, the vaporization of the liquid formamide is carried out at short residence times. Particularly preferred residence times are <20 s, preferably 10 s, in each case based on the liquid formamide.

Owing to the very short residence times in the vaporizer, the formamide can be vaporized virtually completely without by-product formation.

The abovementioned short residence times of the formamide in the vaporizer are preferably achieved in microstructured apparatuses. Suitable microstructured apparatuses which can be used as vaporizers are described, for example, in DE-A 101 32 370, WO 2005/016512 and WO 2006/108796.

A particularly preferred method of vaporizing liquid formamide and particularly preferred microvaporizers are described in the simultaneously filed patent application having the title "Improved process for preparing hydrocyanic acid by catalytic dehydration of gaseous formamide" and the European application number 07 120 540.5, which is expressly incorporated by reference.

The use of microstructured vaporizers in combination with the process of the invention makes it possible to provide particularly compact and inexpensive plants for preparing hydrocyanic acid from formamide.

The process of the invention for preparing hydrocyanic acid gives the desired hydrocyanic acid in high selectivities of generally >90%, preferably >95%, so that yields of generally >80%, preferably >85%, particularly preferably >88%, are achieved.

The invention claimed is:
1. A process for preparing hydrocyanic acid, comprising:
dehydrating gaseous formamide at temperatures of from 350 to 650° C. in the presence of a catalyst and 0.1 to 10 mol % oxygen in a reactor, and
coupling the dehydration of the gaseous formamide with an exothermic reaction in the reactor,
wherein the coupling of the dehydration and the exothermic reaction comprises two separate fluid paths separated by a common reactor wall in the reactor, with one fluid path being provided for the dehydration of formamide and the second fluid path being provided for the exothermic reaction and a specific thermal conductivity λ of the common reactor wall material is greater than 100 W/(mK), wherein the exothermic reaction is a catalytic combustion of combustible gases with introduction of oxygen, and the reactor is a tube reactor or plate reactor comprising at least two parallel, superposed layers A and B, with the layer A having at least two parallel reaction channels in which the catalytic dehydration occurs and the layer B having at least two parallel channels in which the exothermic reaction occurs, and the common reactor wall separating the fluid paths comprises a material selected from the group consisting of copper, silver, aluminum, magnesium and oxidation-resistant silicon-infiltrated silicon carbide.

2. The process according to claim 1, wherein a side of the common reactor wall which is in contact with the combustible gas has a catalytically active coating.

3. The process according to claim 2, wherein the catalytically active coating is selected from the group consisting of Pt, Pd, Ag, and Au, alloys comprising Pt, Pd, Ag, and Au, oxides selected from the group consisting of MgO, CoO, $MoO_3$, NiO, ZnO, $Cr_2O_3$, $WO_3$, SnO, $CuO/Cu_2O$, $MnO_2$ and $V_2O_5$, mixed oxides selected from the group consisting of $CuO$—$ZnO$—$Al_2O_3$, $CoO$—$MgO$, $CoO$—$La_2O_3$, $La_2CuO_4$, $Nd_2CuO_4$, and $Co$—$ZnONiO$—$MoO_3$, perovskites selected from the group consisting of $LaMnO_3$, $CoTiO_3$, $LaTiO_3$ and $CoNiO_3$ and spinels selected from the group consisting of $CuAl_2O_4$, $MgAl_2O_4$, $(Cu, Zn)Al_2O_4$, $(Cu, Zn, Ba)Al_2O_4$, $(Cu, Zn, Mg)Al_2O_2$, $(Cu, Zn, Va) Al_2O_4$ and $LaNiO_4$.

4. The process according to claim 1, wherein the oxygen is introduced into the combustible gas or the combustible gas is introduced into the oxygen at a plurality of points along the fluid path for the exothermic reaction.

5. The process according to claim 1, wherein the catalytic dehydration is carried out at a pressure of from 100 mbar to 4 bar.

6. The process according to claim 1, wherein the catalytic dehydration is carried out at a length-specific space velocity of formamide of from 0.02 to 0.4 kg/(mh) in a region of laminar flow of the dehydration fluid path.

7. The process according to claim 1, wherein the content of oxygen is from 0.5 to 3 mol %.

8. The process according to claim 1, wherein the catalytic dehydration is carried out in the presence of:

1) shaped bodies selected from the group consisting of highly sintered shaped bodies made up of aluminum oxide, highly sintered shaped bodies made up of aluminum oxide and silicon oxide and shaped chromium-nickel stainless steel bodies;

2) packings composed of steel or iron oxide on porous support materials or 3) a catalytically active coating on the side of the common reactor wall which is in contact with the formamide.

9. The process according to claim 1, wherein the at least two parallel reaction channels of the layer A have an average hydraulic diameter of from 1 to 6 mm, and the at least two parallel channels of the layer B have an average hydraulic diameter of less than 4 mm.

10. The process according to claim 1, wherein the fluid path for the dehydration of formamide and the fluid path for the exothermic reaction each have a length of from 2 to 100 cm.

* * * * *